United States Patent
Turcas

(10) Patent No.: US 9,790,954 B2
(45) Date of Patent: Oct. 17, 2017

(54) PROPELLER, ENGINE COOLING DEVICE COMPRISING SUCH A PROPELLER, AND MOULD FOR PRODUCING SAID PROPELLER

(75) Inventor: Sylvain Turcas, Vitre (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 749 days.

(21) Appl. No.: 13/498,179

(22) PCT Filed: Sep. 28, 2010

(86) PCT No.: PCT/EP2010/064344
§ 371 (c)(1),
(2), (4) Date: Jun. 8, 2012

(87) PCT Pub. No.: WO2011/039173
PCT Pub. Date: Apr. 7, 2011

(65) Prior Publication Data
US 2012/0244000 A1    Sep. 27, 2012

(30) Foreign Application Priority Data
Sep. 29, 2009    (FR) ...................... 09 04651

(51) Int. Cl.
*F01D 5/22*    (2006.01)
*F04D 29/32*    (2006.01)
(Continued)

(52) U.S. Cl.
CPC ........ *F04D 29/326* (2013.01); *B29C 45/0025* (2013.01); *B29C 45/0046* (2013.01); *B29L 2031/08* (2013.01)

(58) Field of Classification Search
CPC .... F04D 29/325; F04D 29/326; F04D 29/582; B29C 45/0025; B29C 45/0046; B29L 2031/08
(Continued)

(56) References Cited

U.S. PATENT DOCUMENTS 3,842,902 A * 10/1974 Poslusny ...................... 165/51
4,213,426 A *  7/1980 Longhouse ............... 123/41.49
(Continued)

FOREIGN PATENT DOCUMENTS

DE    19847632 A1    5/1999
FR     2789449 A1    8/2000
(Continued)

OTHER PUBLICATIONS

English language abstract and translation extracted from the espacenet.com database on May 21, 2012, 10 pages.
(Continued)

*Primary Examiner* — Craig Kim
*Assistant Examiner* — Alexander White
(74) *Attorney, Agent, or Firm* — Howard & Howard Attorneys PLLC

(57) ABSTRACT

A propeller (1) includes a hub (2), blades (3), and a shell (4) having two flanks (41, 42) connected by an elbow, the blades (3) extending from the hub (2) to the shell (4). The thickness (e1, e2) of at least one part of at least one of the flanks (41, 42) of the shell (4) is reduced towards the free end of the flank.

6 Claims, 2 Drawing Sheets

(51) Int. Cl.
  *B29C 45/00* (2006.01)
  *B29C 45/26* (2006.01)
  *F04D 29/26* (2006.01)
  *B29L 31/08* (2006.01)

(58) Field of Classification Search
  USPC .............. 415/171.1, 173.5, 173.6, 174.5;
         416/169 A, 179, 182, 185, 189, 192, 234
  See application file for complete search history.

(56) References Cited

U.S. PATENT DOCUMENTS

| | | | |
|---|---|---|---|
| 4,396,351 A | 8/1983 | Hayashi et al. | |
| 6,241,474 B1 | 6/2001 | Alizadeh et al. | |
| 6,596,370 B2 | 7/2003 | Hyuga et al. | |
| 7,086,825 B2 | 8/2006 | Wang et al. | |
| 7,789,628 B2 | 9/2010 | Stagg et al. | |
| 2005/0051309 A1* | 3/2005 | Mori et al. | 165/121 |
| 2007/0280829 A1* | 12/2007 | Stevens et al. | 416/189 |
| 2009/0311101 A1 | 12/2009 | Moreau et al. | |
| 2010/0272573 A1 | 10/2010 | Bessho et al. | |

FOREIGN PATENT DOCUMENTS

| | | |
|---|---|---|
| JP | 07-205241 A | 8/1995 |
| JP | 08-224762 A | 9/1996 |
| WO | WO 2007/107489 A1 | 9/2007 |
| WO | WO 2009/107278 A1 | 9/2009 |

OTHER PUBLICATIONS

English language abstract for FR 2789449 extracted from the espacenet.com database on May 21, 2012, 29 pages.
English language abstract and translation for JP 07-205241 extracted from the PAJ database on May 21, 2012, 25 pages.
English language abstract and translation for JP 08-224762 extracted from the PAJ database on May 21, 2012, 79 pages.
English language abstract for WO 2007/107489 extracted from the espacenet.com database on May 21, 2012, 24 pages.
English language abstract for WO 2009/107278 extracted from the espacenet.com database on May 21, 2012, 22 pages.
International Search Report for Application No. PCT/EP2010/064344 dated Jun. 7, 2011, 7 pages.

* cited by examiner

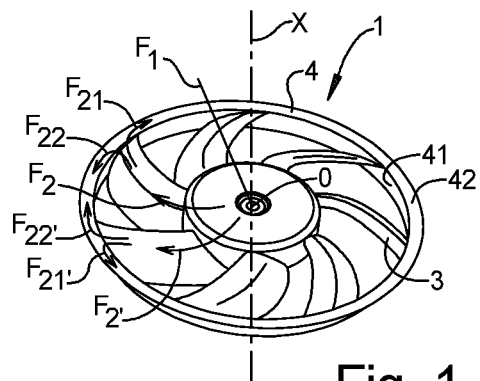
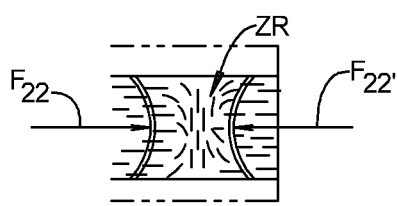
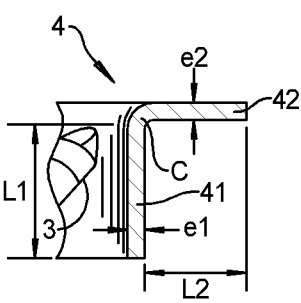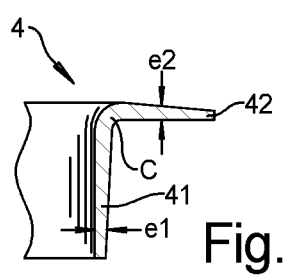
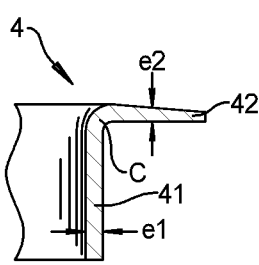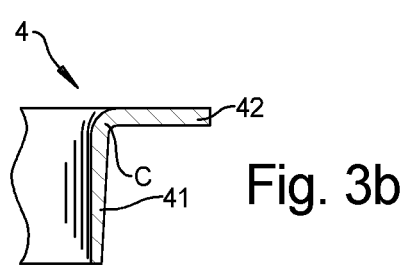
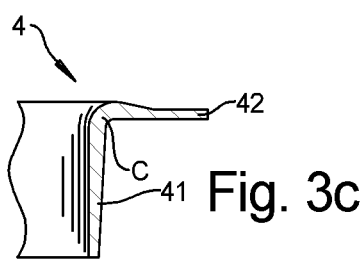

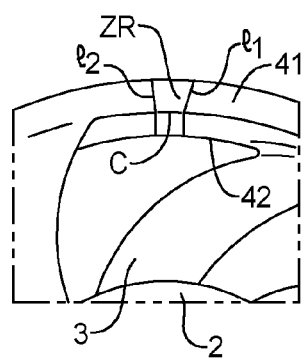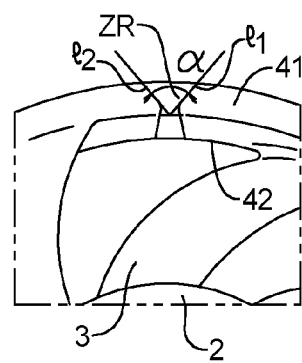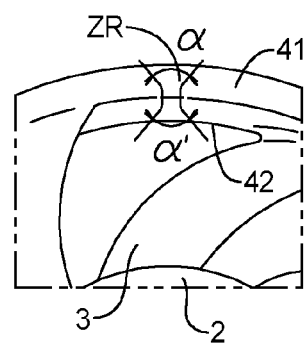
Fig. 5  Fig. 6a  Fig. 7a
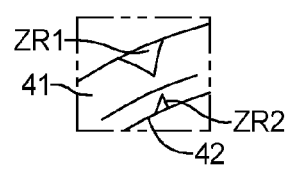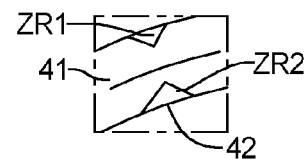
Fig. 6b  Fig. 7b

PROPELLER, ENGINE COOLING DEVICE COMPRISING SUCH A PROPELLER, AND MOULD FOR PRODUCING SAID PROPELLER

RELATED APPLICATIONS

This application claims priority to and all the advantages of International Patent Application No. PCT/EP2010/064344, filed on Sep. 28, 2010, which claims priority to French Patent Application No. FR 09/04651, filed on Sep. 29, 2009.

The present invention relates to a propeller, in particular a propeller for engine cooling, an engine cooling device comprising such a propeller, a method of manufacturing such a propeller and a mold capable of being used to manufacture such a propeller.

BACKGROUND TO THE INVENTION

It is known to use propellers to create currents of air in the direction of exchangers to lower the temperature of exothermic engines, such as automotive vehicle engines or other locomotive engines.

In the known manner, a propeller of this type is composed of a central hub, also referred to as the bowl, about which twisted elements commonly referred to as blades are uniformly distributed. The hub is designed to be fitted securely onto the shaft of an engine. The external ends of the blades are generally connected together by an element which is concentric to the hub, commonly referred to as the rim or shell, of which the function is to provide good structural rigidity to the propeller assembly and to ensure the relative support of the different blades. Examples of said propellers, for example, will be found in the patent application WO-2007/107489 A1, which proposes a novel blade profile in order to improve the aeraulic and acoustic performances thereof.

In practice, said propellers have a solid, one-piece structure made of polymer material, which may be reinforced, and are manufactured by an injection-molding method. Said method consists, in simplified form, in injecting the polymer material in the viscous state into a mold, generally via one or more injection-molding ports located in the region of the hub, the material filling the mold flowing into the mold from the area of the mold corresponding to the hub toward the area corresponding to the shell via areas corresponding to the blades. As a result, in the region of the shell, so-called joined-up areas are created where two opposing flows of material, originating from two areas of the mold corresponding to two adjacent blades, meet one another. Said joined-up areas are generally of lower mechanical strength than the remainder of the propeller, as the mixture of the two flows in said areas is never perfectly homogeneous and intimate, due to the differences in temperature between the two front regions of material and the differences in orientation of the fibers of the reinforcing material, in the case where the polymer material is reinforced by a fibrous reinforcement. Said two flows have opposing directions of displacement, and said areas tend to be the collecting point for bubbles of gas or impurities in the interface lines defining said areas, bubbles or impurities which are more difficult to remove via vents in said areas than elsewhere in the mold. In practice, when the propeller ages or is subjected to significant and repeated mechanical stresses, there is an increased risk that it ruptures specifically in the region of one of said joined-up areas of reduced mechanical strength.

SUBJECT OF THE INVENTION

The subject of the invention is a propeller, the design thereof aiming to minimize the aforementioned drawbacks. Thus the invention targets a propeller of improved design, which is stronger mechanically. More specifically, the invention targets a propeller of which the shell is stronger mechanically, in particular in the region of the joined-up areas thereof.

GENERAL DEFINITION OF THE INVENTION

The subject of the invention is a propeller comprising a hub, blades and a shell having two flanks connected by an elbow piece, the blades extending from the hub to the shell.

The aforementioned object is achieved according to the invention by the thickness of at least one part of at least one of the flanks of the shell being reduced toward the free end of said flank.

More specifically, it has been shown that this choice of dimensioning influences in a very advantageous manner the cohesion of the joined-up areas located in the region of the shell which, de facto, would cause an improvement in the mechanical strength of the propeller in said areas, hitherto known as being the areas which are more fragile mechanically than the remainder of the propeller. By reducing the thickness of at least one of the flanks of the shell, according to the invention, the velocity of the flow of material into the mold is modified toward the free end of the flank, and the two opposing flows meet at a velocity which becomes lower as the free end of the flank of the shell is approached. As a result, a joined-up area having a different shape is obtained, comprising edges which diverge toward the free end of the flank. Also, it has been shown that this different shape would lead to significantly improved mechanical strength in said areas, leading to a significantly reduced risk of rupture in said areas than before. Diverging edges would facilitate the removal of bubbles and impurities along substantially V-shaped interface lines, in the direction of vents, and said diverging edges would also promote the mixing of the two flows, thus increasing the resistance to rupture, compared to interface lines which are substantially parallel in the front regions.

The subject of the invention is also a method for injection-molding in a mold a propeller comprising a hub, blades and a shell having two flanks connected by an elbow piece, the blades extending from the hub to the shell, a method where the material is injected in the fluid state in the area of the mold corresponding to the hub so that the material fills the mold by spreading toward the area of the mold corresponding to the shell via areas of the mold corresponding to the blades. According to the invention, the velocity of the flow of material injected into the area of the mold corresponding to the shell is adjusted in order to obtain joined-up areas having diverging edges at least locally in the shell between each blade.

The invention has thus been able to prove that it has been possible to modify the profile of the joined-up areas by modifying the velocity of the flow of material into said areas. It is possible to conceive in a non-limiting manner two ways of modifying said velocity: it is possible to choose to modify the passage cross section, in particular in the thickness direction, of the mold in the region of at least one of the flanks of the shell toward its free end, which accordingly has the effect of slowing down the progression of the flows of material in this direction. It is possible also (alternatively or in addition to the preceding option) to modify the temperature profile of the walls of the mold in the region of said joined-up areas, by imposing a lower temperature in the areas where it is desired to reduce the velocity of the flow rate.

The subject of the invention is also an injection mold of a propeller comprising a hub, blades and a shell having two flanks connected by an elbow piece, the blades extending from the hub to the shell, the mold comprising an area corresponding to the hub, an area corresponding to each of the blades and an area corresponding to the shell, the area corresponding to the shell having a reduction in the passage cross section in the thickness direction of at least one of the flanks of the shell toward its free end. The deceleration of the flows of material due to this reduction in the thickness of the flank(s) of the shell makes it possible to improve the cohesion of the joined-up areas and, as a result, to improve the mechanical strength thereof.

The subject of the invention is also any engine cooling device comprising at least one propeller as described above or obtained by the method as disclosed above.

BRIEF DESCRIPTION OF THE DRAWINGS

Further features and advantages of the invention will be revealed more clearly from reading the following description and the accompanying drawings, relating to two particular non-limiting embodiments, with reference to the accompanying drawings, in which:

FIG. 1 shows a perspective view of a propeller according to the prior art;

FIG. 2a shows a cross section of a shell belonging to a propeller according to the prior art, FIG. 2b showing the formation of a joined-up area in the region of the shell according to the prior art;

FIGS. 3a and 3b show a cross section of a shell belonging to a propeller according to a first embodiment, according to a first variant (FIG. 3a) and according to a second variant (FIG. 3b) of said embodiment;

FIG. 4 shows a cross section of a shell belonging to a propeller according to a second embodiment according to the invention;

FIG. 5 shows an enlargement of a shell of the prior art according to FIG. 2, illustrating the so-called joined-up area obtained when the propeller is manufactured by injection-molding;

FIGS. 6a, 6b show enlargements of a shell portion according to the invention according to FIG. 3a at different stages during the molding process, illustrating the development of the shape of the so-called joined-up area in a similar manner to FIG. 5;

FIGS. 7a, 7b show enlargements of a shell according to the invention according to FIG. 4 at different stages during the molding process, illustrating the development of the shape of the so-called joined-up area in a similar manner to FIGS. 6a, 6b.

All the figures are very schematic and do not necessarily respect scale, to facilitate the reading thereof, each element shown keeping the same reference numeral in all of the figures.

DESCRIPTION OF EMBODIMENTS OF THE INVENTION

FIG. 1 shows a propeller 1 according to the prior art, comprising, in the known manner, a hub 2 with a central axis X, a plurality of blades 3, one end thereof being connected to the hub and the other end to a shell 4. The shell comprises a first flank 41 which is of substantially cylindrical shape and coaxial with the axis X of the hub 2 and which defines the face with which the ends of the blades 3 come into contact. The shell 4 comprises a second flank 42 extending radially relative to the axis X of the hub 2 from one of the edges of the first flank 41, the two flanks being connected by an elbow piece C.

FIG. 2a shows a section of the shell 4, with its two flanks 41 and 42 of uniform and substantially identical thickness e1 and e2.

The propeller is obtained by an injection-molding method in a mold of a material based on a polymer of appropriate viscosity. In this case the polymer belongs to the family of polyamides, reinforced by glass fibers. No further details will be given at this stage of the method by injection-molding, a method which is well known per se. Alternatively, other polymers may be used, in particular a polymer from the family of polypropylenes.

As shown symbolically (arrow F1) in FIG. 1, the material is injection-molded in a mold in the region of the hub 2, then flows (arrows F2) from the hub 2 toward the blades 3. At the other end of the blades, the flow of material, schematically, is separated into two flows of material in opposing directions in the region of the shell 4 (arrows F21, F21', F22, F22'). Also, as shown in FIG. 2b, the opposing flows (arrows F22, F'22) originating from two adjacent blades 3 meet in the region of the shell 4, in the part separating said blades. Thus a so-called joined-up area ZR is defined which is gradually filled with material, by the material of the two opposing flows of material meeting, said two flows of opposing material being mixed in the front regions thereof.

It is understood from all the FIGS. 5 to 7 that the so-called joined-up areas, as shown, are areas of the mold which are devoid of material and where the two flows meet to fill said void.

In the part during the molding process, as shown in FIG. 5, in the region of the shell 4, there is a joined-up area ZR in the thickness of the shell on its two flanks 41, 42, an area defined by two interface lines 11, 12 which are lines of the two front regions of material which meet one another as the mold is gradually filled. It is seen here that said lines are parallel or virtually parallel relative to one another, which is not mechanically advantageous when the propeller rotates at high velocity and is subjected to shear or torsional stresses acting on the shell in said joined-up areas ZR.

Naturally, the joined-up area shown in FIG. 5 (and in the following figures) may be distinguished relatively clearly here by the naked eye, by removing the incomplete parts from the mold before the part is finished. The outline of this joined-up area may also be seen by the naked eye on the finished part, in the form of an interface line. Generally, the outline of the joined-up area in the finished part is more visible when the two front regions of material are substantially parallel, as is the case of the shell according to FIG. 5, and slightly less visible or markedly less visible when the two front regions of material are not parallel, as is the case of the shells according to FIGS. 6 and 7.

If it occurs that the propeller breaks in the region of the shell 4, in the most frequent case this will be in the region of the outline of one of said joined-up areas ZR in the finished propeller, along a clean break surface.

The present invention consists, all things being equal, in modifying said propeller according to the prior art by reducing the thickness of at least one of the flanks 41, 42 of the shell 4 toward its free end.

According to a first embodiment, and as shown in FIGS. 3a and 3b, only one of the flanks of the shell 4 has a thickness which is reduced from the elbow piece to its free end. In the case of FIG. 3a, according to a first variant, it is the flank 42, i.e. that which extends radially. In the case of FIG. 3b, according to a second variant, it is the flank 41, i.e. that with which the blades 3 come into contact.

According to a second embodiment, and as shown in FIG. 4, the thickness e1, e2 of the two flanks 41, 42 of the shell 4 is reduced toward the free end of each of the flanks.

In the two embodiments as shown, the reduction in thickness in the shell is gradual: the thicknesses e1 and/or e2 are gradually reduced from the elbow piece C to the free end of the flank 41, 42 under consideration.

Alternatively, the thickness e1 and/or e2 of one or both flanks 41, 42 may be reduced over one portion only of the flank in question, in particular in the vicinity of the elbow piece C, for example at least in the first half of the length L1, L2 of the flank in question and may be substantially uniform over a further portion of the flank, in particular in the vicinity of the free end of the flank in question. It is recommended to avoid the end of each of the flanks from becoming too narrow, if only for practical reasons when producing the mold.

It is possible to select, for example, in the vicinity of the elbow pieces, slightly greater thicknesses e1, e2, in particular 10, 20% or 30% greater than the thicknesses used in propellers according to the prior art, and to select a rate of the reduction in thickness such that, in the end, the total material content is substantially that of a propeller according to the prior art. It is possible, therefore, to maintain a substantially unchanged weight in the propeller.

Alternatively, it is possible for the reduction in thickness not to be gradual, i.e. stepwise.

FIG. 6a shows the joined-up area ZR corresponding to the variant according to FIG. 3a at a first molding stage: it may be seen that the joined-up area (which is devoid of material) on the flank 42 which has been reduced in thickness, has edges which diverge toward the free end of the flank 42. The angle α between the two interface lines, which according to the prior art were substantially parallel, is approximately 90° here. FIG. 6b shows the same joined-up area at a second molding stage, naturally less extensive than in the case of FIG. 6a, with two separate areas ZR1, ZR2 no longer being joined at the surface in the region of the elbow piece C, and on the flank 42 a joined-up area ZR2 with diverging edges still being maintained.

FIG. 7a shows the joined-up area ZR corresponding to the variant according to FIG. 4 at a first molding stage. It may be seen that the joined-up area has diverging edges on each of the flanks 41, 42 with an angle α between the interface lines 11, 12 of approximately 90° on each of the flanks 41, 42. FIG. 7b shows the same joined-up area at a second molding stage: as in the case of FIG. 6b, here the joined-up area is in two parts ZR1, ZR2, which are no longer joined in the region of the elbow piece and which as in FIG. 7a, have diverging edges (angles α, α' between the two interface lines of each of the joined-up areas) on each of the flanks 41, 42.

The propeller according to the invention is in one piece. It is obtained by injection-molding and thus advantageously has joined-up areas having diverging edges at least locally in the region of the shell between each blade.

The reduction in thickness in the shell according to the invention is advantageously at least 30% between the thickness of the shell in the region of the elbow piece and the thickness of the shell in the region of the free edge. It is understood thereby that in the portion of the flank where the thickness is reduced, the minimum thickness is at least 30% less than the maximum thickness. It has been observed that the greater the reduction in thickness, the more the edges of the joined-up area diverge, naturally with limitations in terms of method and production of the molds, which has the result that the reduction in thickness is generally limited, in particular to approximately 50% and at most 60 or 70%.

In said embodiments according to the invention, the velocity of the flow of material injected into the area of the mold corresponding to the shell is adjusted by reducing the passage cross section of the flow of material injected in the direction of the thickness of at least one of the flanks of the shell toward its free end.

The invention is not limited to the embodiments which have been disclosed above but encompasses any variant using equivalent means to reproduce the essential characteristics set forth above.

For example, the invention encompasses methods for manufacturing a propeller where the mechanical strength of the joined-up areas is improved by differences in temperature in the region of the injection mold.

The invention relates to any type of propeller comprising a shell, including those obtained by bi-injection-molding and composed of several different (possibly reinforced) polymers.

It also applies to propellers comprising a rotor onto which the body of the propeller is over-molded. It also applies to propellers of which the shell has different shapes from those illustrated above, having in particular flanks of different relative thicknesses, lengths, shapes or gradients.

The invention claimed is:

1. A propeller (1) comprising an outer shell (4), an inner hub (2), blades (3) extending radially between said hub (2) and said shell (4), and said shell (4) having two flanks (41, 42) connected by an elbow piece and comprising a polymer material reinforced by a fibrous reinforcement and being integral, unitary, and one-piece, the blades (3) extending from the hub (2) to the shell (4), wherein one of the two flanks (41, 42) has an outer surface and an inner surface each extending axially and being planar an entire length thereof and the other of the two flanks has an outer surface and an inner surface each extending radially and being planar an entire length thereof, wherein in a first half of a length, but not an entire length, of at least one of the two flanks (41, 42) from the elbow piece to a free end a thickness (e1, e2) of at least one of the two flanks (41, 42) of the shell (4) is reduced gradually toward a free end of the two flanks (41, 42) and wherein a remainder of the length from the first half of the length to the free end of the at least one of the two flanks (41, 42) a thickness is substantially uniform, wherein the reduction in thickness (e1, e2) in the shell (4) is at least 30% between a thickness of the shell (4) in a region of the elbow piece and the thickness of the shell (4) in a region of the free edge.

2. The propeller (1) as claimed in claim 1, wherein a thickness (e1, e2) of the two flanks (41, 42) of the shell (4) is reduced gradually toward the free end of each of the two flanks (41, 42).

3. The propeller (1) as claimed in claim 2, wherein the shell (4) comprises a substantially cylindrical first flank (41), coaxial with an axis (X) of the hub (2) and defining a face with which ends of the blades (3) come into contact, and in that the second flank (42) extends radially from one edge of the first flank (41).

4. The propeller (1) as claimed in claim 1, wherein the shell (4) comprises a substantially cylindrical first flank (41), coaxial with an axis (X) of the hub (2) and defining a face with which ends of the blades (3) come into contact, and in that the second flank (42) extends radially from one edge of the first flank (41).

5. An engine cooling device comprising at least one propeller (1) as claimed in claim 1.

6. An injection mold of a propeller (1) comprising an outer shell (4), an inner hub (2), blades (3) extending radially between said hub (2) and said shell (4), said shell (4) having two flanks (41, 42) connected by an elbow piece and comprising a polymer material reinforced by a fibrous reinforcement and being integral, unitary, and one-piece, the blades (3) extending from the hub (2) to the shell (4), wherein one of the two flanks (41, 42) has an outer surface and inner surface each being planar and extending axially and the other of the two flanks has an inner surface and an outer surface being planar and extending radially, the injection mold comprising an area corresponding to the hub (2), an area corresponding to each of the blades (3) and an area corresponding to the shell (4), the area corresponding to the shell (4) having in a first half of a length, but not an entire length, of at least one of the two flanks (41, 42) from the elbow piece to its free end a thickness ($e1$, $e2$) is gradually reduced and wherein a remainder of the length from the first half of the length to the free end of the at least one of the two flanks (41, 42) a thickness is substantially uniform, wherein a reduction in thickness ($e1$, $e2$) in the shell (4) is from 30% to 50% between a thickness of the shell (4) in a region of the elbow piece and a thickness of the shell (4) in a region of the free end.

\* \* \* \* \*

UNITED STATES PATENT AND TRADEMARK OFFICE
CERTIFICATE OF CORRECTION

| | |
|---|---|
| PATENT NO. | : 9,790,954 B2 |
| APPLICATION NO. | : 13/498179 |
| DATED | : October 17, 2017 |
| INVENTOR(S) | : Sylvain Turcas |

It is certified that error appears in the above-identified patent and that said Letters Patent is hereby corrected as shown below:

In the Claims

Claim 6, Column 7, Line 26, please delete "from 30%" and replace with -- from at least 30% --

Signed and Sealed this
Thirteenth Day of February, 2018

Andrei Iancu
*Director of the United States Patent and Trademark Office*